(12) United States Patent
Styron

(10) Patent No.: US 8,949,002 B2
(45) Date of Patent: Feb. 3, 2015

(54) SYSTEM AND METHOD FOR INJECTING FUEL

(75) Inventor: Joshua Putman Styron, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 429 days.

(21) Appl. No.: 13/401,536

(22) Filed: Feb. 21, 2012

(65) Prior Publication Data

US 2013/0218440 A1  Aug. 22, 2013

(51) Int. Cl.
*F02D 41/30* (2006.01)

(52) U.S. Cl.
USPC ............................ 701/105; 701/104; 123/299

(58) Field of Classification Search
USPC .......... 701/102–105, 110; 123/299, 304, 305, 123/446, 456, 457, 475, 495, 506, 510
See application file for complete search history.

(56) References Cited

U.S. PATENT DOCUMENTS

| | | | |
|---|---|---|---|
| 4,699,103 A | 10/1987 | Tsukahara et al. | |
| 4,886,026 A | 12/1989 | Cook | |
| 5,438,967 A | 8/1995 | Ito | |
| 5,676,118 A | 10/1997 | Saito | |
| 5,740,775 A | 4/1998 | Suzuki et al. | |
| 6,234,153 B1 | 5/2001 | DeGroot et al. | |
| 6,367,452 B1 | 4/2002 | Shima et al. | |
| 6,371,077 B1 | 4/2002 | McGee | |
| 6,516,782 B1 | 2/2003 | Thomas | |
| 6,742,492 B2 | 6/2004 | Kimura | |
| 6,763,799 B2 | 7/2004 | Ito et al. | |
| 6,823,834 B2 * | 11/2004 | Benson et al. | 123/299 |
| 6,968,699 B2 * | 11/2005 | Howell et al. | 60/776 |
| 6,994,077 B2 | 2/2006 | Kobayashi et al. | |
| 7,051,699 B2 * | 5/2006 | McGee et al. | 123/295 |
| 7,278,593 B2 * | 10/2007 | Wang et al. | 239/533.2 |
| 7,284,506 B1 | 10/2007 | Sun et al. | |
| 7,350,504 B2 | 4/2008 | Yasunaga et al. | |
| 7,500,471 B2 | 3/2009 | Adachi et al. | |
| 7,677,222 B2 | 3/2010 | Ishikawa | |
| 7,798,129 B2 * | 9/2010 | Smith | 123/478 |
| 7,848,871 B2 | 12/2010 | Onishi et al. | |
| 7,849,842 B1 | 12/2010 | Lewis et al. | |

(Continued)

FOREIGN PATENT DOCUMENTS

| | | |
|---|---|---|
| EP | 0489493 A2 | 10/1991 |
| EP | 1001153 B1 | 11/1999 |
| WO | 2009063298 A1 | 5/2009 |

OTHER PUBLICATIONS

Kurtz, Eric et al., "System and Method for Compensating Cetane," U.S. Appl. No. 13/401,501, filed Feb. 21, 2012, 51 pages.

(Continued)

*Primary Examiner* — John Kwon
*Assistant Examiner* — Johnny H Hoang
(74) *Attorney, Agent, or Firm* — Julia Voutyras; Alleman Hall McCoy Russell & Tuttle LLP

(57) ABSTRACT

Methods and systems for adjusting fuel injection of an internal combustion engine are disclosed. In one example, a change in fuel pressure is scheduled when a number of pilot fuel injections provided by a fuel injector to a cylinder transitions from a first number during a first engine cycle to a second number during a second engine cycle. The methods and systems may reduce engine emissions and improve engine noise characteristics.

20 Claims, 9 Drawing Sheets

(56) References Cited

U.S. PATENT DOCUMENTS

| | | |
|---|---|---|
| 7,885,754 B2 * | 2/2011 | Topinka et al. .............. 701/104 |
| 8,051,829 B2 | 11/2011 | Kurtz et al. |
| 2002/0139111 A1 | 10/2002 | Ueda et al. |
| 2002/0170532 A1 * | 11/2002 | Dutart et al. ................. 123/299 |
| 2007/0137207 A1 * | 6/2007 | Mancini et al. ................ 60/737 |
| 2007/0199545 A1 * | 8/2007 | McGee ......................... 123/480 |
| 2007/0235009 A1 | 10/2007 | Nakashima et al. |
| 2008/0103678 A1 | 5/2008 | Teraji et al. |
| 2008/0264149 A1 * | 10/2008 | Hazelton et al. ............. 73/35.06 |
| 2008/0281500 A1 * | 11/2008 | Nakata et al. ................. 701/103 |
| 2010/0108035 A1 * | 5/2010 | Dusa et al. .................... 123/453 |
| 2011/0226214 A1 * | 9/2011 | Ogata et al. ................... 123/299 |

OTHER PUBLICATIONS

Mariucci, Vincent Edward, "Method and System for Reducing Soot Formed by an Engine," U.S. Appl. No. 13/314,081, filed Dec. 7, 2011, 37 pages.

* cited by examiner

EXAMPLE FIRING
ORDER AND
TRANSITION TIMINGS
FOR CYLINDER BANKS

SYSTEM AND METHOD FOR INJECTING FUEL

FIELD

The present description relates to injecting fuel to an internal combustion engine. In one example, a method for adjusting fuel pressure along with a number of pilot fuel injections is disclosed. The approach may be particularly useful for compression ignition engines.

BACKGROUND/SUMMARY

Combustion in diesel engines is facilitated via compressing air-fuel mixtures within engine cylinders. As an air-fuel mixture is compressed, temperature and pressure within the cylinder increases such that the air-fuel mixture ignites without an externally supplied ignition source such as a spark plug. Ignition of the air-fuel mixture releases heat and increases temperature and pressure within the cylinder. Depending on conditions, the engine combustion may increase engine noise and reduce driver satisfaction.

One approach to address combustion noise is to provide pilot fuel injections during a cylinder cycle. The pilot fuel injections are introduced to a cylinder in advance of the main fuel injection pulse. By adjusting the number and timing of pilot fuel injections, it may be possible to change the ignition time and rate of heat release during combustion of an air-fuel mixture so as to reduce combustion noise and improve driver satisfaction. However, a fixed number of pilot fuel injections may not provide desirable engine combustion noise and heat release characteristics over an engine operating range. Rather, it may be desirable to vary the number of pilot fuel injections with engine operating conditions. Nevertheless, if a number of pilot fuel injections is changed and pressure of the injected fuel is not at a desired level when the number of fuel injections changes, engine noise may not be within a desired range.

The inventor herein has recognized the above-mentioned disadvantages and has developed a method for fueling an engine, comprising: transitioning from supplying fuel to a cylinder based on a first relationship between fuel pressure and a number of pilot fuel injections to supplying fuel to the cylinder based on a second relationship between fuel pressure and the number of pilot fuel injections, the transitioning in response to a first condition when a control parameter is increasing.

By changing between different fuel pressure controls tables as a number of pilot fuel injections are changed, it may be possible to provide improved fuel pressure control for fuel injectors when a number of pilot fuel injections are changed in response to a change in engine operating conditions. For example, a first fuel rail pressure control table may be the basis for controlling fuel rail fuel pressure when a single pilot fuel injection pulse is provided to a cylinder. On the other hand, a second fuel rail pressure control table may be the basis for controlling fuel rail fuel pressure when two pilot fuel injection pulses are provided to the cylinder. Thus, fuel rail pressure may be adjusted by jumping between two fuel rail fuel pressure tables in response to a number of pilot fuel injections supplied to a cylinder. In this way, fuel pressure may be quickly changed as a number of pilot fuel injections change so that fuel pressure lag between different operating conditions may be reduced.

The present description may provide several advantages. Specifically, the approach may useful for transitioning between fuel injection modes. In particular, the approach may reduce engine emissions such as HC, NOx, and CO by allowing more rapid fuel pressure changes between conditions where different numbers of pilot fuel injections are supplied by a fuel injector. Further, the approach may reduce an amount of time to calibrate an engine because calibrating for gradual transitions between fuel injection mode changes may be avoided.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
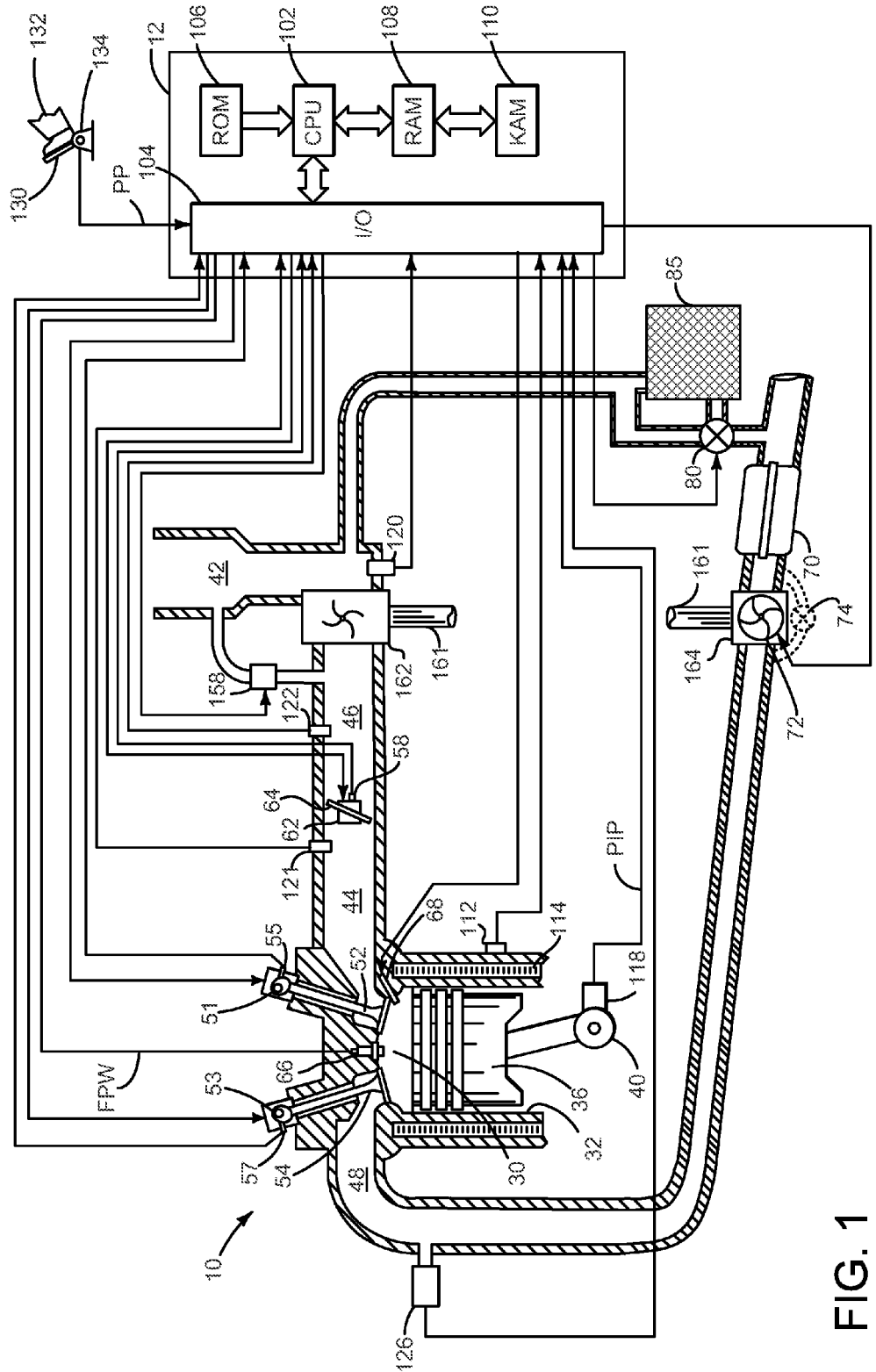
FIG. 1 shows a schematic depiction of an engine.
Figure 2:
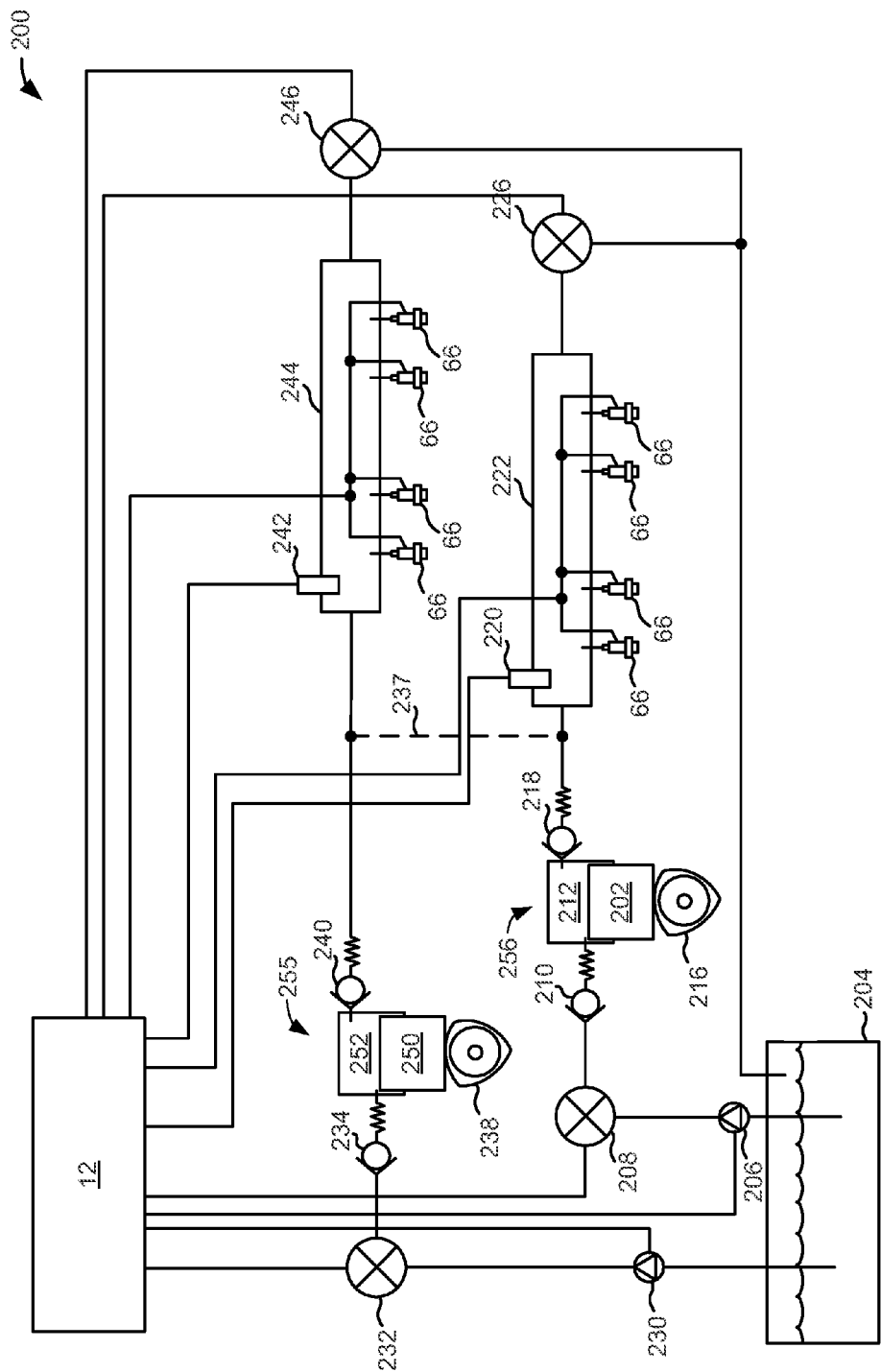
FIG. 2 shows a detailed depiction of a fuel system that supplies fuel to the engine.
Figure 3:
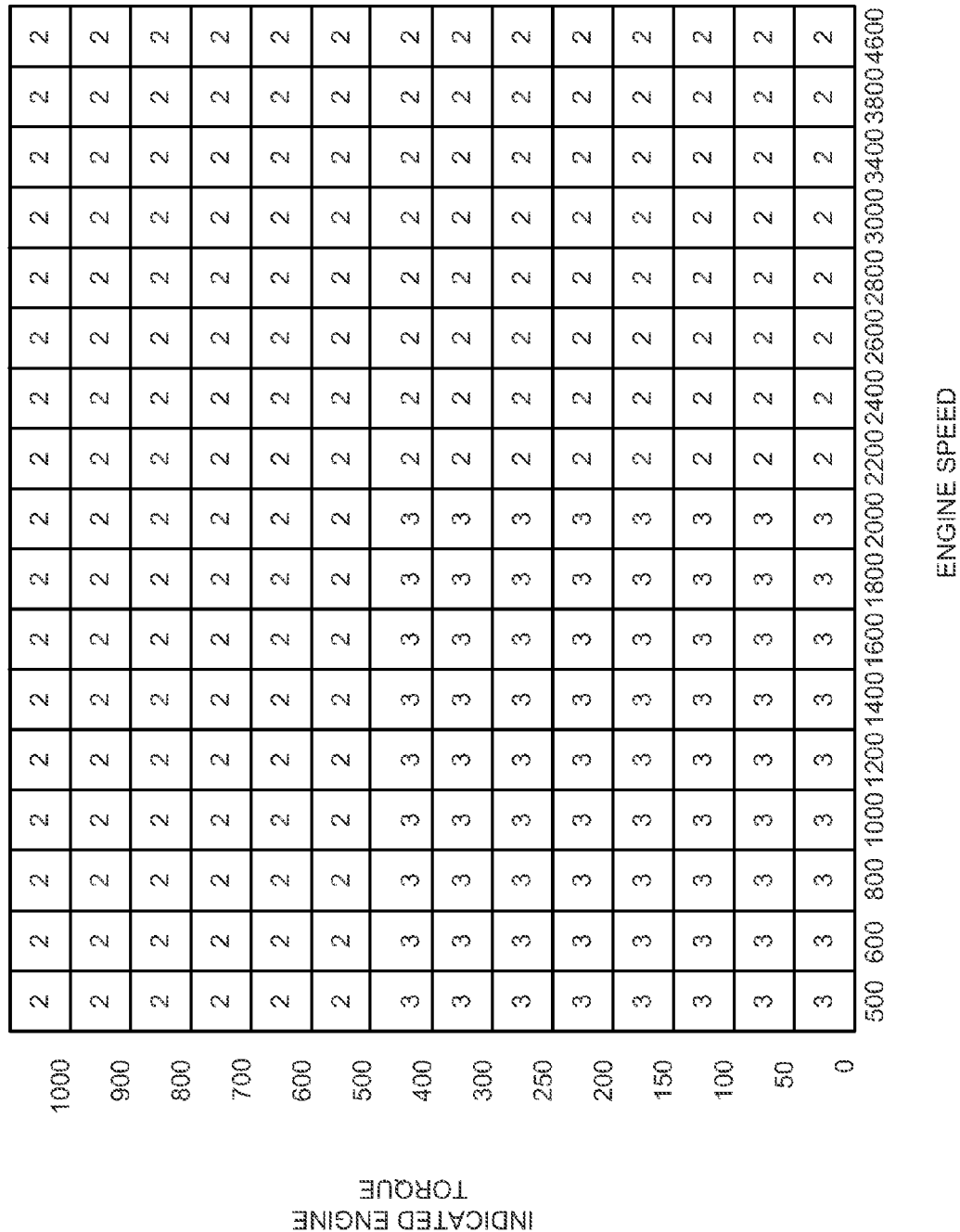
FIG. 3 shows an example pilot fuel injection number map.
Figure 6:
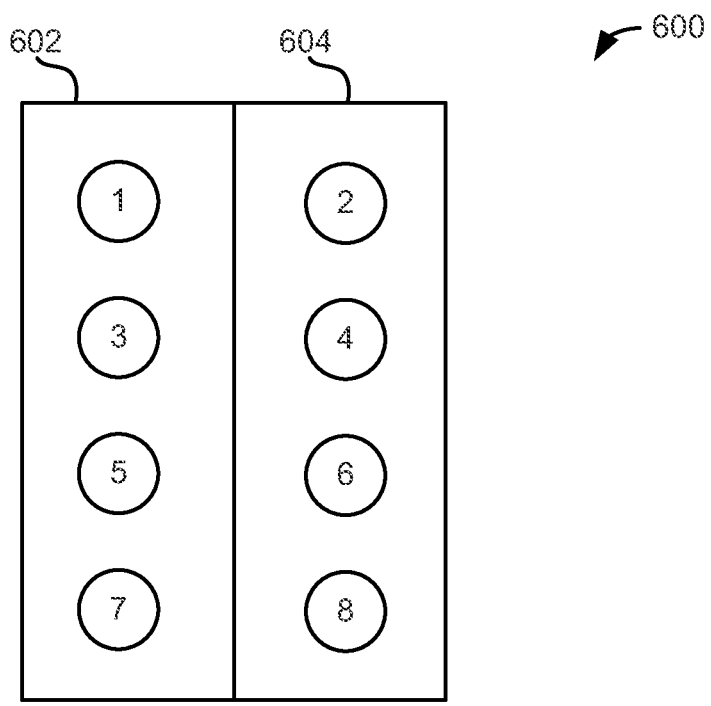
FIG. 6 shows an example cylinder numbering order for an engine with two cylinder banks.
Figure 7:
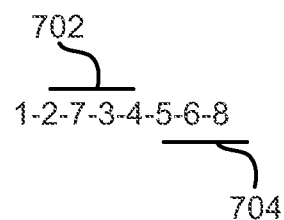
FIG. 7 shows an example firing order and mode change interval for adjusting a number of pilot fuel injections.
Figure 9:
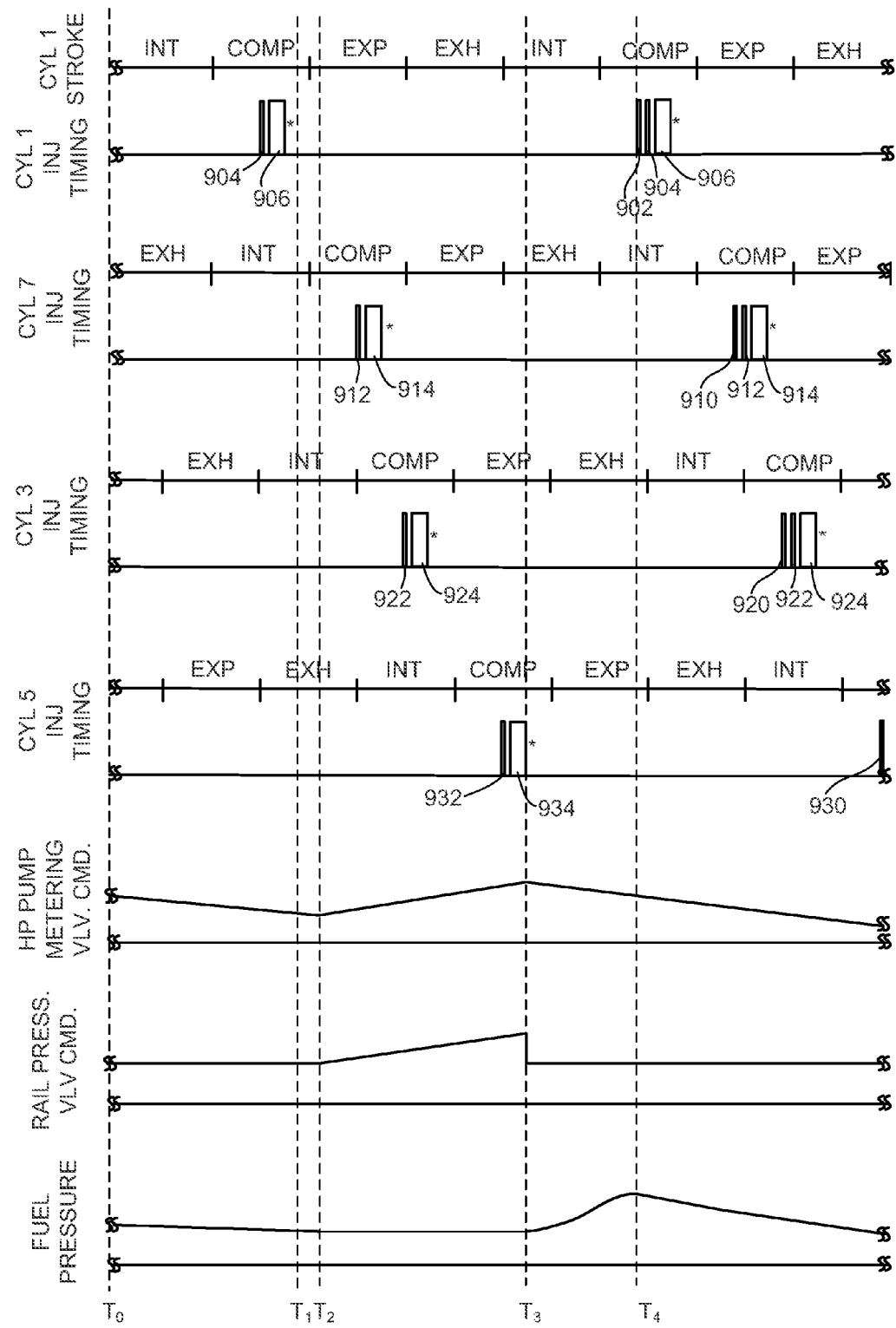
Figure 10:
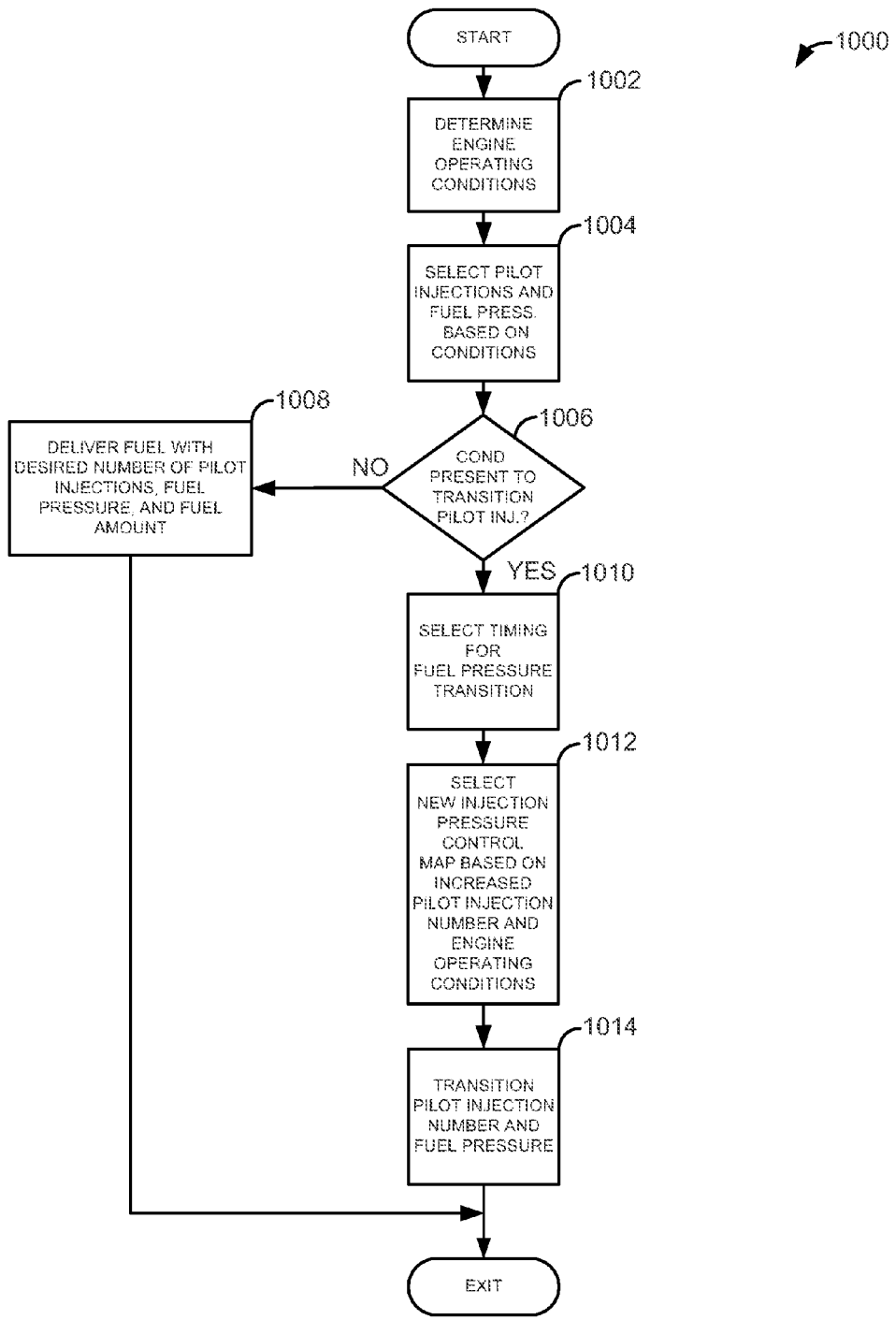
FIG. 10 shows an example flowchart for a method to adjust fuel pressure and a number of pilot fuel injections supplied to a cylinder of an engine.

The present description is related to compensating for changing a number of pilot fuel injections that are delivered to a cylinder during a cylinder cycle. FIG. 1 shows one example of a boosted diesel engine where the method of FIG. 10 may adjust a number of pilot fuel injections and fuel pressure to improve engine emissions and/or reduce combustion noise. FIG. 2 shows an example fuel delivery system for an engine with two cylinder banks. FIG. 3 shows an example pilot fuel injection map. FIGS. 4-5 and 8-9 show examples of fuel pressure adjustments in response to numbers of pilot fuel injection pulses. FIGS. 6 and 7 show an example cylinder layout and firing order for an engine having two cylinder banks. Finally, FIG. 10 is a flowchart of an example method for adjusting fuel pressure and a number of pilot fuel pluses supplied to a cylinder of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be deter-} mined by intake cam sensor 55. The position of exhaust cam 53 may be determined by exhaust cam sensor 57.

Fuel injector 66 is shown positioned to inject fuel directly into combustion chamber 30, which is known to those skilled in the art as direct injection. Fuel injector 66 delivers fuel in proportion to the pulse width of signal FPW from controller 12. Fuel is delivered to fuel injector 66 by a fuel system as shown in FIG. 2. Fuel pressure delivered by the fuel system may be adjusted by varying an inlet metering valve regulating flow to a fuel pump (not shown) and a fuel rail pressure control valve.

Intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162 via shaft 161. In some examples, a charge air cooler may be provided. Compressor speed may be adjusted via adjusting a position of variable vane control 72 or compressor bypass valve 158. In alternative examples, a waste gate 74 may replace or be used in addition to variable vane control 72. Variable vane control 72 adjusts a position of variable geometry turbine vanes. Exhaust gases can pass through turbine 164 supplying little energy to rotate turbine 164 when vanes are in an open position. Exhaust gases can pass through turbine 164 and impart increased force on turbine 164 when vanes are in a closed position. Alternatively, wastegate 74 allows exhaust gases to flow around turbine 164 so as to reduce the amount of energy supplied to the turbine. Compressor bypass valve 158 allows compressed air at the outlet of compressor 162 to be returned to the input of compressor 162. In this way, the efficiency of compressor 162 may be reduced so as to affect the flow of compressor 162 and reduce the possibility of compressor surge.

Combustion is initiated in combustion chamber 30 when fuel automatically ignites as piston 36 approaches top-dead-center compression stroke. In some examples, a universal Exhaust Gas Oxygen (UEGO) sensor 126 may be coupled to exhaust manifold 48 upstream of emissions device 70. In other examples, the UEGO sensor may be located downstream of one or more exhaust after treatment devices. Further, in some examples, the UEGO sensor may be replaced by a NOx sensor that has both NOx and oxygen sensing elements.

At lower engine temperatures glow plug 68 may convert electrical energy into thermal energy so as to raise a temperature in combustion chamber 30. By raising temperature of combustion chamber 30, it may be easier to ignite a cylinder air-fuel mixture via compression.

Emissions device 70 can include a particulate filter and catalyst bricks, in one example. In another example, multiple emission control devices, each with multiple bricks, can be used. Emissions device 70 can include an oxidation catalyst in one example. In other examples, the emissions device may include a lean NOx trap or a selective catalyst reduction (SCR), and/or a diesel particulate filter (DPF).

Exhaust gas recirculation (EGR) may be provided to the engine via EGR valve 80. EGR valve 80 is a three-way valve that closes or allows exhaust gas to flow from downstream of emissions device 70 to a location in the engine air intake system upstream of compressor 162. In alternative examples, EGR may flow from upstream of turbine 164 to intake manifold 44. EGR may bypass EGR cooler 85, or alternatively, EGR may be cooled via passing through EGR cooler 85. In other, examples high pressure and low pressure EGR system may be provided.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measurement of engine manifold pressure (MAP) from pressure sensor 121 coupled to intake manifold 44; boost pressure from pressure sensor 122 exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle. In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Referring now to FIG. 2, a detailed depiction of a fuel system that supplies fuel an engine is shown. The fuel system of FIG. 2 may be included in the engine system of FIG. 1 and may be controlled via the method of FIG. 10.

Fuel system 200 includes various valves and pumps that are controlled by controller 12. Fuel pressure in fuel rails 244 and 222 is sensed via pressure sensors 242 and 220. Controller 12 controls pressure in fuel rails 244 and 222 using pressure feedback from pressure sensors 242 and 220. Controller 12 activates fuel pumps 206 and 230 to supply fuel to metering valves 232 and 208. Check valves 234 and 210 allow fuel to flow to high pressure fuel pumps 255 and 256 and limit back flow from high pressure fuel pumps 255 and 256. Metering valves 232 and 208 control the amount of fuel entering high pressure fuel pumps 255 and 256. Cams 238 and 216 are driven by the engine and provide motive force to pistons 250 and 202 which operate on fuel in pump chambers 252 and 212.

High pressure fuel pumps 255 and 256 direct fuel to fuel injector rails 244 via check valves 240 and 218. Fuel pressure in fuel rails 244 and 222 may be controlled via adjusting valves 232, 208, 226, and 246. Fuel rail pressure control valves 226 and 246 may be positioned partially open during operating conditions such that at least a portion of fuel supplied by fuel pumps 255 and 256 returns to fuel tank 204. Fuel rail pressure control valves 226 and 246 may be at least partially opened an additional amount during some conditions to reduce fuel pressure in the fuel rails 222 and 244. Fuel rail pressure control valves 226 and 246 may be at least partially closed during some conditions to increase fuel pressure in fuel rails 222 and 244. Fuel rail 222 may provide fuel to one cylinder bank of an engine via fuel injectors 66 while fuel rail 244 supplies fuel to a second cylinder bank of the engine via fuel injectors 66. In some examples, a single high pressure fuel pump may supply fuel to both fuel rails 244 and 222 via optional conduit 237. Fuel rail pressure control valve 226 may be controlled separately from fuel rail pressure control valve 246 so that timing of fuel pressure increases and decreases may occur at different times Likewise, high pressure fuel pump 255 and high pressure fuel pump 256 may be controlled separately via fuel metering valves 232 and 208.

Thus, the system of FIGS. 1 and 2 provides for an engine system, comprising: a cylinder; a fuel rail; a fuel injector in fluidic communication with the fuel rail and directly injecting fuel into the cylinder; and a controller including a computer program stored in a non-transitory medium including executable instructions to adjust fuel pressure in the fuel rail based on a number of pilot fuel injections provided to the cylinder during a cycle of the cylinder, the controller including instructions to delay adjusting fuel pressure in the fuel rail after a condition for adjusting a number of pilot fuel injections is reached, the duration of the delay based on an engine crankshaft angular window. The controller also includes instructions to increase a fuel pressure in the fuel rail via increasing a high pressure fuel pump metering valve command and decreasing a fuel rail pressure control valve command.

The engine system also includes where the fuel rail pressure control valve command is increased prior to decreasing the fuel rail pressure control valve command. The engine system includes where the crankshaft angular window is based on a crankshaft interval where there is no fuel injected to a plurality of cylinders of a cylinder bank. The engine system further comprises additional instructions to change between two or more fuel pressure storage structures when the number of pilot fuel injections is changed. The engine system also includes where the fuel pressure storage structures are tables including a plurality of fuel pressure values. The engine system further comprises additional instructions to decrease fuel pressure in the fuel rail via decreasing the high pressure fuel pump metering valve command and increasing the fuel rail pressure control valve command.

In some examples, the engine system further comprises additional controller instructions to adjust fuel pressure at a first condition when a control parameter is increasing and adjust fuel pressure at a second condition when the control parameter is decreasing. The engine system further comprises a fuel rail pressure control valve, a high pressure fuel pump supplying fuel to the fuel rail, and a metering valve regulating fuel flow to the high pressure fuel pump. The engine system of claim 19, further comprising additional instructions to increase fuel pressure in the fuel rail via adjusting the metering valve and the fuel rail pressure control valve.

Referring now to FIG. 3, an example pilot fuel injection number map is shown. The table includes a plurality of cells. Each of the cells includes a value that represents a total number of fuel injections provided to an engine cylinder during a cycle of the cylinder and over the course of an engine cycle. For example, a value of two represents one pilot fuel injection and one main fuel injection to a cylinder during a cycle of the cylinder. The table Y axis represents indicated engine torque as provided in response to an engine torque request. The table X axis represents engine speed. Thus, for a unique engine torque and speed, the table outputs a number of pilot fuel injections that are provided to an engine cylinder during an engine cycle. The table shows an increased number of pilot fuel injections at lower engine speeds and loads to reduce engine noise under such conditions.

Figure 4:
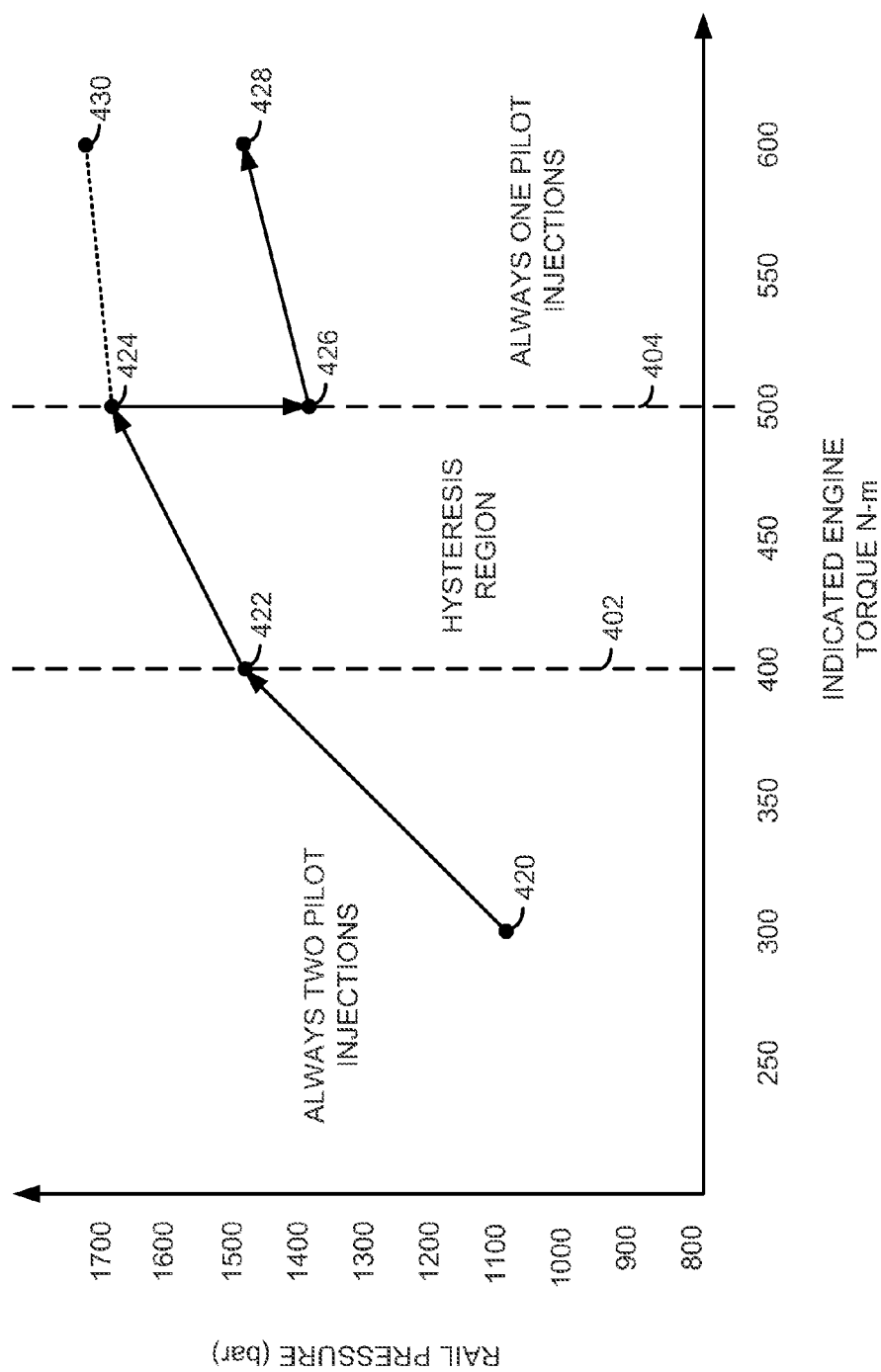
FIGS. 4 and 5 show example transitions for adjusting a number of pilot fuel pulses supplied to a cylinder.

Referring now to FIG. 4, an example of a transition from providing a first number of pilot fuel injections to providing a second number of pilot fuel injections is shown. In particular, the example of FIG. 4 shows a transition from two pilot fuel injections to one pilot fuel injection as engine indicated torque increases. The transition of FIG. 4 may be provided by the system of FIGS. 1 and 2 via the method of FIG. 10.

The Y axis represents fuel rail pressure and fuel rail pressure increases in the direction of the Y axis arrow. The X axis represents indicated engine torque and indicated engine torque increases in the direction of the X axis arrow. Vertical markers 402 and 404 represent example engine torque levels where a number of pilot fuel injections may be adjusted based on engine torque. Vertical marker 402 represents an engine torque where fuel injected into a cylinder using one pilot injection is transitioned to injecting fuel with two pilot injections when engine torque is decreasing. Vertical marker 404 represents an engine torque where fuel injected into a cylinder using two pilot injections is transitioned to injecting fuel with one pilot injection when engine torque is increasing.

The example transition of FIG. 4 begins at 420 where fuel injection pressure is relatively low and fuel is injected to a cylinder with two pilot fuel injections. As engine torque increases toward 400 N-m, fuel rail fuel pressure increases such that fuel pressure increases to a level shown at 422. The fuel delivery system enters the hysteresis region where the number of pilot injections is not increased or decreased. As engine torque continues to increase, pressure in the fuel rail is increased so that fuel rail fuel pressure reaches the level shown at 424. Once engine torque reaches the hysteresis upper boundary at 500 N-m, fuel rail fuel pressure is dropped and one pilot fuel injection is provided to each cylinder during each cylinder cycle. The fuel pressure is reduced to the level shown at 426 once engine torque reaches the hysteresis upper boundary at 500 N-m.

In one example, the fuel pressure is changed by switching from a first fuel rail desired pressure table that outputs a desired fuel rail fuel pressure that is based on engine torque and a first number of pilot fuel injections to a second fuel rail desired pressure table that outputs a different desired fuel rail pressure that is based on engine torque and a second number of pilot fuel injections. In other examples, engine speed may also be a basis for adjusting fuel pressure. For example, a first table may output a fuel rail pressure of 1400 bar when engine torque is 499 N-m and two pilot fuel injections are provided. The second table may output a fuel rail pressure of 1200 bar when engine torque is 500 N-m and one pilot fuel injection is provided. Thus, as engine torque increases the output from the second table is substituted for the output of the first table and fuel pressure is changed along with the number of pilot fuel injections.

As engine torque continues to increase, fuel rail pressure is also increased to the level indicated at 428 when a single pilot fuel injection is provided. The fuel rail fuel pressure increase from 426 to 428 is provided by values output from the second fuel rail desired pressure table. The fuel rail fuel pressure increases from 420 to 424 are provided by values output from the first fuel rail desired pressure table. If the number of pilot fuel injections had not decreased at 404, fuel pressure would have followed the dotted line from 424 to 430 based on output from the first fuel rail desired pressure table.

In this way, fuel pressure and number of pilot fuel injections provided to a cylinder during a cylinder cycle may be varied. Transitioning from one fuel rail desired pressure table to another fuel rail desired pressure table allows for stepwise changes in fuel injection pressure commands so that fuel rail pressure may be better optimized for the number of pilot fuel injections during transitions in numbers of pilot fuel injections.

Figure 5:
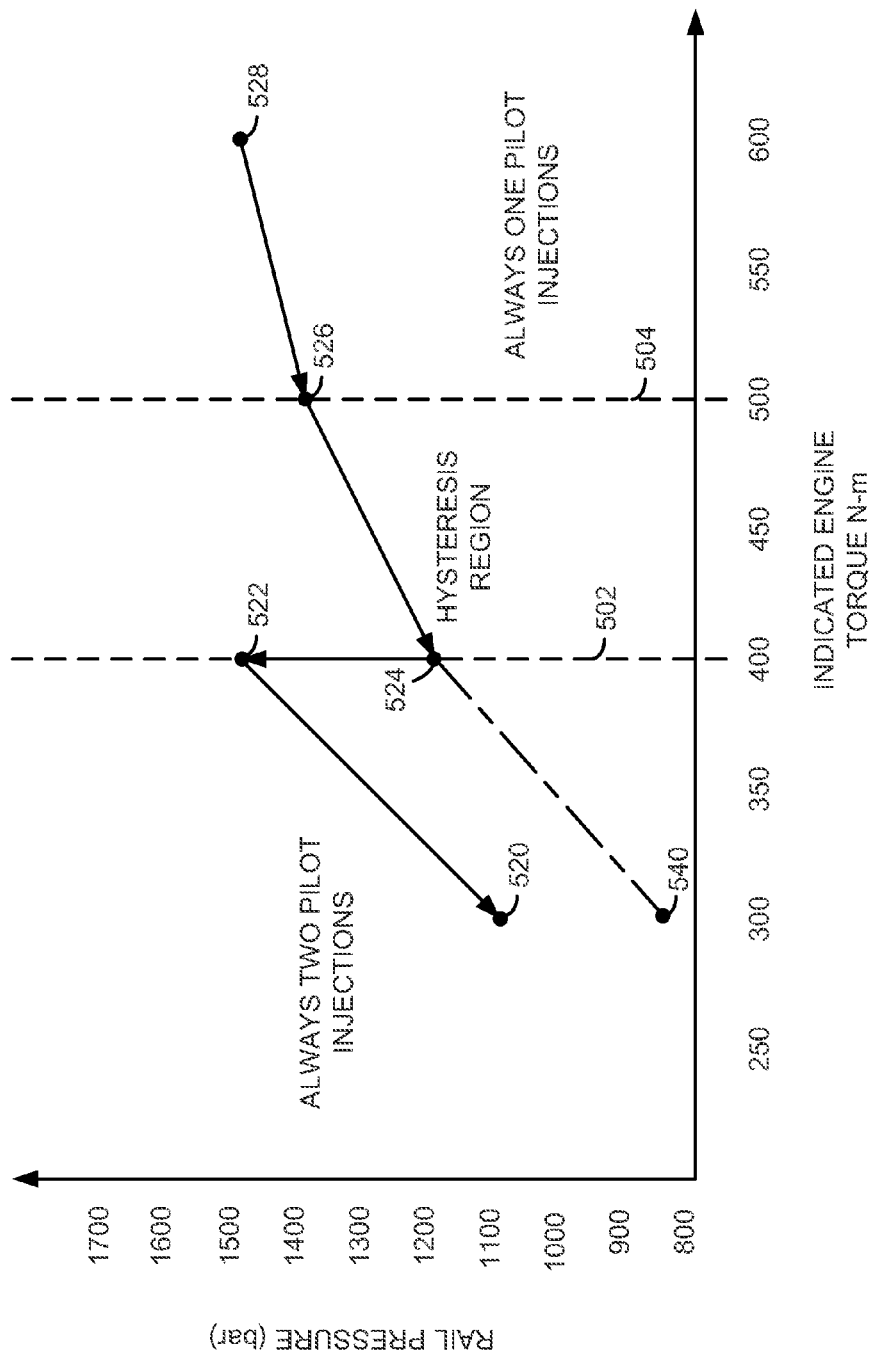

Referring now to FIG. 5, a plot of an example transition for adjusting a number of pilot fuel pulses supplied to a cylinder is shown. Specifically, a plot that illustrates a sequence of transitioning from one pilot fuel injection to two pilot fuel injections is shown. The plot of FIG. 5 is similar to the plot of FIG. 4 therefore the description of similar features of the plots is omitted for brevity. Vertical marker 502 represents a lower hysteresis boundary while vertical marker 504 represents an upper hysteresis boundary.

The transition of FIG. 5 begins at 528 where the engine is operating at a relatively high engine torque. The engine is operated at the high engine torque and a single pilot fuel injection at a relatively high fuel pressure is provided. As engine torque demand decreases, fuel pressure is reduced and fuel rail fuel pressure drops to the level indicated at 526. When engine torque is reduced further, fuel pressure in the fuel rail is further reduced to the level shown at 524. Thus, fuel pressure at the engine torque levels shown between 524 and 528 is output from a second desired fuel rail fuel pressure table similar to that described for FIG. 4. As engine torque decreases and the lower hysteresis boundary 502 is reached, fuel rail pressure is adjusted to a level output from a first desired fuel rail fuel pressure table and fuel rail pressure increases to the level shown at 522. Additionally, the number of pilot fuel injections is increased from one to two. When engine torque is further decreased, fuel pressure is reduced to a level shown at 520. If the number of pilot fuel injections had not been adjusted at vertical marker 502, fuel pressure would have followed the trajectory of the dotted line between 524 and 540.

It should be noted in the examples of FIGS. 4 and 5 as well as throughout the description, the number of pilot fuel injections supplied in any one cylinder cycle may be a number from zero to five. Therefore, six desired fuel pressure tables based on engine speed, number of pilot fuel injections, and engine torque may be provided and used in the system of FIGS. 1-2 as well as the method of FIG. 10.

Referring now to FIG. 6, an example engine bank configuration is shown. Engine 600 includes a plurality of cylinders, eight in particular. First cylinder bank 602 includes cylinder numbers 1, 3, 5, and 7. Second cylinder bank 604 includes cylinder numbers 2, 4, 6, and 8. The engine of FIG. 6 may have a firing order as indicated in FIG. 7 to improve engine balance and reduce engine vibration.

Referring now to FIG. 7, an example firing order and mode change interval for adjusting a number of pilot fuel injections and fuel pressure is shown. The engine firing order is 1-2-7-3-4-5-6-8. Thus, the example engine is an eight cylinder engine. It should be noted in conjunction with FIG. 6, that engine 600 does not fire in the order that cylinders are numbered (e.g., 1-8). Rather, the engine combusts in an order that jumps across cylinder banks one and two as well as combusting two cylinder events in a row where the cylinders are located in the same cylinder bank (e.g., cylinders 6 and 8).

Region 702 shows a particular part of the engine firing order where fuel injection events for cylinder bank number two are spread a farthest time or crankshaft angle apart over an engine cycle. Specifically, fuel injection occurs in cylinder numbers 7 and 3 of cylinder bank number one in region 702 while no fuel is injected to cylinder bank number one. This allows a fuel rail pressure for cylinder bank number two to transition between an end of fuel injection for cylinder number 2 to the beginning of fuel injection for cylinder number 4 without affecting the injected fuel amount. Thus, by selectively choosing where fuel pressure for fuel rail number two transitions from a first pressure to a second pressure, the amount of time for the fuel pressure to transition may be increased as compared to other timings over an engine cycle. Consequently, the fuel pressure may have a better possibility of reaching the desired fuel pressure when a number of pilot fuel injections transitions from a first value to a second value.

Similarly, region 704 shows a particular part of the engine firing order where fuel injection events for cylinder bank number one are spread a farthest time or crankshaft angle apart over an engine cycle. Specifically, fuel injection occurs in cylinder numbers 6 and 8 of cylinder bank number two in region 804. This allows a fuel rail pressure for cylinder bank number one to transition between an end of fuel injection for cylinder number 5 to the beginning of fuel injection for cylinder number 1 without affecting the injected fuel amount. Thus, by selectively choosing where fuel pressure for fuel rail number one transitions from a first pressure to a second pressure, the amount of time for the fuel pressure to transition may be increased as compared to other timings over an engine cycle. As a result, the fuel pressure may have a better possibility of reaching the desired fuel pressure when a number of pilot fuel injections transitions from a first value to a second value.

Figure 8:
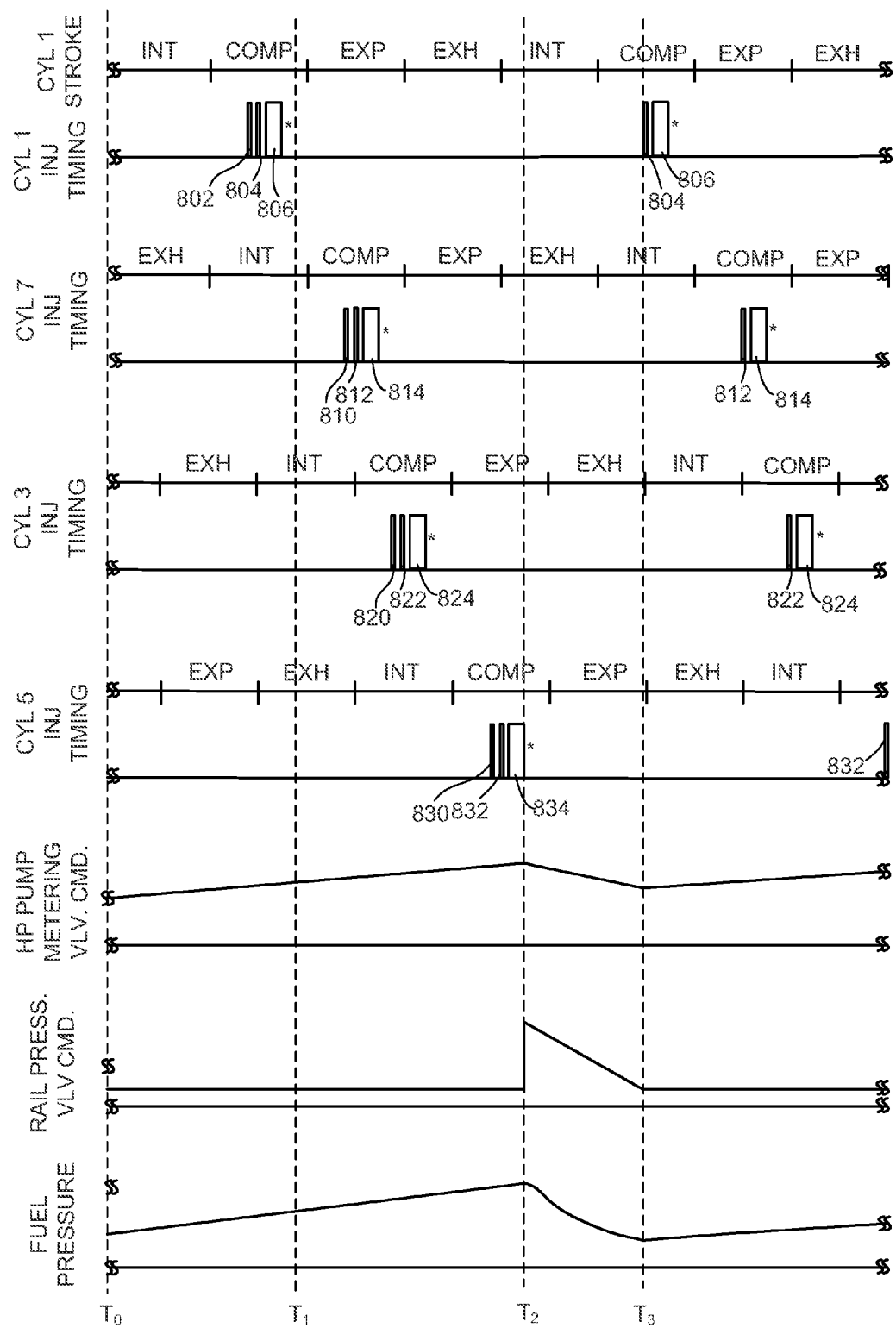
FIGS. 8 and 9 show example pilot fuel injection transition sequences.

Referring now to FIG. 8, an example pilot fuel injection transition sequence is shown. The sequence of FIG. 8 may be provided by the system of FIGS. 1 and 2 executing the method of FIG. 10. Cylinder timing for one cylinder bank of an engine including cylinders 1, 3, 5, and 7 is shown. Note that actual fuel injection times may differ from the timings shown in FIGS. 8 and 9 since FIGS. 8 and 9 are intended to illustrate the method described herein rather than show particular fuel injection timings.

The first, third, fifth, and seventh plots from the top of FIG. 8 represent cylinder strokes for cylinders number one, seven, three, and five of an eight cylinder engine as shown in FIG. 6. Intake strokes are abbreviated INT while compression strokes are abbreviated as COMP. Expansion strokes are abbreviated as EXP while exhaust strokes are abbreviated as EXH.

The second, fourth, sixth, and eighth plots from the top of FIG. 8 represent fuel injection events for cylinders number one, seven, three, and five of an eight cylinder engine as shown in FIG. 6. Pilot injections for cylinder number one are indicated as 802 and 804. The main injection pulse for cylinder number one is indicated as 806. Pilot injections for cylinder number seven are indicated as 810 and 812. The main injection pulse for cylinder number seven is indicated as 814.

Pilot injections for cylinder number three are indicated as 820 and 822. The main injection pulse for cylinder number seven is indicated as 824. Pilot injections for cylinder number five are indicated as 830 and 832. The main injection pulse for cylinder number one is indicated as 834.

The ninth plot from the top of FIG. 8 is a plot represents a high pressure fuel pump command. The high pressure fuel pump command increases to increase high pressure pump output pressure. The high pressure fuel pump command decreases in a direction of the X axis to decrease high pressure pump output pressure.

The tenth plot from the top of FIG. 8 is a plot represents a fuel rail pressure valve command. The fuel rail pressure command increases to increase fuel rail pressure. The fuel rail pressure command decreases in a direction of the X axis to decrease fuel rail pressure.

The eleventh plot from the top of FIG. 8 is a plot represents a fuel rail pressure. The fuel rail pressure decreases in a direction of the X axis. The fuel rail pressure increases in the vertical direction away from the X axis.

At time $T_0$, the engine is operating at a lower torque and speed. Consequently, two pilot injections are provided to each cylinder during the respective cycles of the cylinders of the engine. The high pressure pump command is shown increasing to increase fuel pressure with increasing indicated engine torque. The fuel rail pressure control valve command is commanding a partially open fuel rail pressure valve state. The fuel rail pressure is shown with an increasing trend that corresponds to the increasing high pressure pump command. The fuel rail fuel pressure is controlled based on output from a first desired fuel pressure table. The output of the first desired fuel pressure table is based on two pilot fuel injections. Consequently, the fuel pressure is at a higher level and increasing. Fuel injection timing for the pilot fuel injections and main fuel injections during each cylinder cycle are shown during the compression strokes of the respective cylinders. However, other pilot fuel injection and main fuel injection timings may be provided.

At time $T_1$, the engine operating conditions reach a state where it is judged desirable to transition from two pilot fuel injections to a single pilot fuel injection (e.g., during an increase in engine torque). The engine operating conditions may include an engine torque, an engine speed, or a combination of engine control parameters. In some examples, the number of pilot fuel injections may be changed at the time engine operating conditions reach conditions to transition to a different number of pilot fuel injections. However, in the present example, the number of pilot fuel injections is delayed to extend the time allowed for fuel pressure to change as the number of pilot fuel injections is change. Therefore, the number of pilot fuel injections and fuel pressure are not adjusted until time $T_2$. Thus, the time between $T_1$ and $T_2$ is the delay time between when conditions are present to change the number of pilot injections and fuel pressure and the time when the change is commanded. The high pressure pump metering valve command continues follow a high pressure pump metering valve command that is based on two pilot injections, and it increases with increasing indicated engine torque. Fuel pressure follows the increasing high pressure pump metering valve command.

At time $T_2$, the high pressure fuel pump metering valve command is reduced and the fuel rail pressure control valve is command open to allow more fuel to return to the fuel tank from the fuel rail. By substantially simultaneously opening the fuel rail pressure control valve and reducing the high pressure fuel pump metering valve command, fuel pressure in the fuel rail may be reduced.

Between time $T_2$ and time $T_3$, the fuel rail pressure control valve is commanded or adjusted to a more closed state. The high pressure fuel pump metering valve command is further reduced to command the fuel rail pressure lower. The fuel rail pressure is adjusted to a value that is based on output of a second desired fuel pressure table. The fuel pressure values output from the second desired fuel pressure table are based on a single pilot fuel injection pulse. Further, the number of pilot fuel injections delivered to a cylinder during a cylinder cycle is reduced from two fuel injection pulses to a single fuel injection pulse. Consequently, the fuel rail fuel pressure decreases.

At time $T_3$, the first fuel injection occurs since commands to adjust the fuel pressure and numbers of pilot fuel injections are issued. Further, the high pressure fuel pump metering valve command reaches a lower level by time $T_3$. Similarly, the fuel rail pressure control valve command reaches a lower level by time $T_3$. However, in some examples, the high pressure fuel pump metering valve and the fuel rail pressure control valve commands may reach a lower value before or after the first fuel injection event after the fuel pressure transition to a lower pressure. The fuel rail pressure has been reduced by the time of the first injection since commands to adjust the fuel pressure and numbers of pilot fuel injections are issued. Thus, the fuel rail fuel pressure reaches a value that is suited for a fuel injection event that includes a single pilot fuel injection pulse and a main fuel injection pulse. The remaining cylinders of the cylinder bank also receive fuel injection including a single pilot fuel injection and a main fuel pulse after time $T_3$.

It should be noted that fuel rail pressure adjustments and adjustments to the number of pilot fuel injections are delayed from $T_1$ to $T_2$ based on the duration between fuel injections between cylinders of the cylinder bank. During the time between $T_2$ and $T_3$, fuel is injected to cylinder bank number two but not cylinder bank number one. In particular, two fuel injection events occur in cylinders 6 and 8 between time $T_2$ and time $T_3$. The lack of fuel injection to cylinder bank one provides 180 crankshaft degrees of rotation (e.g., 90 degrees between cylinder cycles for an eight cylinder engine) where fuel pressure of fuel supplied to cylinder bank one may be adjusted. Thus, the fuel pressure in the fuel rail supplying fuel to cylinder bank number one can be adjusted without affecting the amount of fuel injected during pilot fuel injections. Therefore, the amount of fuel delivered to the engine at the time of transitioning between two pilot fuel injections and one pilot fuel injection may be improved.

Referring now to FIG. 9, an example pilot fuel injection transition sequence is shown. The sequence of FIG. 9 may be provided by the system of FIGS. 1 and 2 executing the method of FIG. 10. Cylinder timing for one cylinder bank of an engine including cylinders 1, 3, 5, and 7 is shown. The plot of FIG. 9 is similar to the plot of FIG. 8 therefore the description of similar features of the plots is omitted for the sake of brevity. Differences between FIGS. 8 and 9 are described. FIG. 9 represents a transition from a lower number of pilot fuel injections to a higher number of pilot fuel injections as indicated engine torque decreases.

Fuel injection events for cylinder number one include pilot injections 902 and 904 as well as main fuel injection 906. Similarly, fuel injection events for cylinder number seven include pilot fuel injections 910 and 912 as well as main fuel injection 914. Fuel injection events for cylinder number three include pilot fuel injections 920 and 922 as well as main fuel injection 924. Fuel injection events for cylinder number five include pilot fuel injections 930 and 932 as well as main fuel injection 934.

At time $T_0$, the engine is operating at a higher torque and speed, but indicated engine torque and speed are on a decreasing trend. Consequently, one pilot fuel injection is provided to each cylinder during the respective cycles of the cylinders of the engine. The high pressure fuel pump metering valve command is shown with a decreasing trend and the fuel pressure follows the fuel pump metering valve command. The commanded fuel rail fuel pressure is based on output from a second desired fuel pressure table. The output of the second desired fuel pressure table is based on one pilot fuel injection. As a result, the fuel pressure is at a lower level as compared to a level where fuel pressure would be if two pilot fuel injections were being provided.

At time $T_1$, the engine operating conditions reach a state where it is judged desirable to transition from one pilot fuel injection to two pilot fuel injections (e.g., during a reduction in engine torque). The engine operating conditions may include an engine torque, an engine speed, or a combination of engine control parameters. In some examples, the number of pilot fuel injections may be changed at the time engine operating conditions reach conditions to transition to a different number of pilot fuel injections. However, in the present example, the number of pilot fuel injections is delayed to extend the time allowed for fuel pressure to change as the number of pilot fuel injections is change. Therefore, the number of pilot fuel injections and the fuel pressure are not adjusted until time $T_3$. Thus, the time between $T_1$ and $T_3$ is the delay time between when conditions are present to change the number of pilot injections and fuel pressure and the time when the change is commanded.

At time $T_2$, the high pressure fuel pump metering valve command increases to increase output from the high pressure fuel pump. At the same time, the fuel rail pressure control valve is commanded further open. In this way, output of the high pressure fuel pump may be increased without increasing fuel rail pressure.

At time $T_3$, the high pressure fuel pump command is at a higher level and the fuel rail pressure command is decreased in a step wise manner. Closing the fuel rail pressure control valve while the high pressure fuel pump metering valve is commanded to a higher level allows for a rapid increase in fuel rail pressure at time $T_3$. The fuel rail pressure is adjusted to a value that is based on output of a first desired fuel pressure table. The fuel pressure values output from the first desired fuel pressure table are based on two pilot fuel injection pulses. Further, the number of pilot fuel injections delivered to a cylinder during a cylinder cycle is increased from one fuel injection pulse to two fuel injection pulses. Consequently, the fuel rail fuel pressure increases.

At time $T_4$, the first fuel injection occurs since commands to adjust the fuel pressure and numbers of pilot fuel injections are issued. The fuel rail pressure has been increased by the time of the first injection since commands to adjust the fuel pressure and numbers of pilot fuel injections are issued. Thus, the fuel rail fuel pressure reaches a value that is suited for a fuel injection event that includes two pilot fuel injection pulses and a main fuel injection pulse. The remaining cylinders of the cylinder bank also receive fuel injection including two pilot fuel injections and a main fuel pulse after time $T_4$.

Similar to FIG. 8, fuel rail pressure adjustments and adjustments to the number of pilot fuel injections are delayed from $T_1$ to $T_3$ based on the duration between fuel injections between cylinders of the cylinder bank. During the time between $T_3$ and $T_4$ fuel is injected to cylinder bank number two but not cylinder bank number one. In particular, two fuel injection events occur in cylinders 6 and 8 between time $T_3$ and time $T_4$. The lack of fuel injection to cylinder bank one provides 180 crankshaft degrees of rotation (e.g., 90 degrees between cylinder cycles for an eight cylinder engine) where fuel pressure of fuel supplied to cylinder bank one may be adjusted. Thus, the fuel pressure in the fuel rail supplying fuel to cylinder bank number one can be adjusted without affecting the amount of fuel injected during pilot fuel injections. Therefore, the amount of fuel delivered to the engine at the time of transitioning between one pilot fuel injection and two pilot fuel injections may be improved.

Referring now to FIG. 10, a flow chart for a method for adjusting fuel pressure and a number of pilot fuel injections provided during a cylinder cycle is shown. The method of FIG. 10 may be executed by controller 12 of FIGS. 1 and 2 via instructions stored in non-transitory memory.

At 1002, method 1000 determines engine operating conditions. Engine operating conditions may include but are not limited to engine speed, engine torque demand, indicated engine torque, engine position, and engine temperature. Method 1000 proceeds to 1004 after engine operating conditions are determined.

At 1004, method 1000 selects a number of pilot fuel injections and fuel pressure based on operating conditions. Additionally, the amount of fuel to inject may be determined at 1004. In one example, a number of desired fuel pressure tables are indexed and based on a number of available pilot fuel injection pulses. For example, if the fuel system provides for injecting zero, one, or two pilot fuel injections during a cycle of a cylinder based on engine operating conditions, three desired fuel pressure tables are provided. Each of the desired fuel pressure includes fuel pressure demands that are based on the number of pilot fuel injections being injected to the cylinder during the present engine cycle. In some examples, the desired fuel pressure tables may be further based on engine speed and indicated engine torque. Similarly, a table (e.g., see FIG. 3) is provided for determining a number of pilot fuel injections to provide during a cylinder cycle. The pilot fuel injection number may be indexed and based on engine speed and indicated engine torque. The amount of fuel injected may be empirically determined and stored in a table in memory. The table holding the amount of fuel to inject may be indexed using engine speed and indicated engine torque. Method 1000 proceeds to 1006 after the number of pilot injections and fuel pressure are determined.

At 1006, method 1000 judges whether or not there is a request to transition a number of pilot fuel injections based on operating conditions. For example, if previous operating condition called for a single pilot fuel injection and present operating conditions call for two pilot fuel injections, method 1000 may judge that there is a request to transition a number of pilot fuel injections. The transitions may be based on engine speed, indicated torque, and/or other control parameters. If method 1000 judges that conditions are present for changing a number of pilot fuel injections, the answer is yes and method 1000 proceeds to 1010. Otherwise, the answer is no and method 1000 proceeds to 1008.

At 1008, method 1000 delivers fuel with the desired number of pilot injections determined at 1004. Further, the amount of fuel to inject during the cylinder cycle is divided between the pilot injections and the main injection that are delivered to a cylinder during a cylinder cycle. Thus, the fuel injector may be opened and closed several times during a cylinder cycle to deliver the desired amount of fuel with the desired number of pilot injections. Method 1000 proceeds to exit after the fuel is delivered to the cylinder.

At 1010, method 1000 selects timing for transitioning fuel pressure and number of pilot injections to deliver to a cylinder during a cycle of the cylinder. In one example, as illustrated in FIGS. 8 and 9, method 1000 may delay transitioning from one fuel injection pressure and a first number of pilot fuel injections after conditions are met to change fuel pressure and the first number of pilot fuel injections. The delay may be from the time conditions are present where the change is desired to a particular crankshaft angular window where the time between fuel injection events is greatest for a particular cylinder bank. For example, fuel pressure adjustments and number of pilot injection adjustments for a cylinder bank may be delayed until the engine is within a crankshaft interval or window where an opposite cylinder bank has two adjacent fuel injection events (e.g., fuel delivered to a cylinder during a cycle of a cylinder including pilot and main injections) in an order of combustion. In this way, the adjustments to fuel pressure and number of pilot injections for a cylinder bank may be scheduled where no fuel injections occur or where the fuel pressure change will occur over a fewer number of fuel injection events of the cylinder bank where the fuel pressure adjustment is made.

In an example where a single high pressure fuel pump supplies fuel to two fuel rails, fuel rail pressure may be increased or decreased by adjusting the fuel rail pressure control valve of on cylinder bank during a longest period between injection events of the cylinder bank. The high pressure fuel pump output pressure may be adjusted at the time conditions are present where it is desirable to change the number of pilot fuel injections. Thus, the pressure in the fuel rail may be adjusted by two different commands (e.g., the high pressure fuel pump pressure command and the fuel rail pressure control valve command) that are staggered in time. Method 1000 proceeds to 1012 after timing of the fuel pressure adjustment and timing of the number of pilot fuel injections is determined.

At 1012, method 1000 selects the revised fuel injection pressure and number of pilot fuel injections. In one example, method 1000 switches from extracting desired fuel pressure from a first table to extracting desired fuel pressure from a second table. The first and second tables are based on different numbers of pilot fuel injections. Further, output of the first and second tables may be based on engine torque, speed, and other operating conditions such as engine temperature. The number of pilot fuel injections is extracted from the table holding the number of pilot fuel injections (e.g., see FIG. 3). The table holding the number of pilot fuel injections may be indexed via engine torque and engine speed. In other examples, the table holding the number fuel injections may be further indexed based on engine temperature and/or other control variables. Method 1000 proceeds to 1014 after revised fuel injection pressure and numbers of pilot fuel injections are determined.

At 1014, method 1000 transitions to the desired fuel pressure and number of pilot fuel injections at the timing determined at 1010. Fuel pressure may be increased by adjusting a metering valve that controls flow to a high pressure fuel pump. Further, fuel pressure may be adjusted via adjusting a position of a fuel rail pressure control valve. The high pressure fuel pump metering valve and fuel rail pressure control valves may be adjusted at substantially the same time or staggered in time. The number of pilot fuel injection pulses is adjusted by adjusting opening and closing times of the fuel injectors.

In one example, when fuel rail pressure is lowered in response to a decreasing number of pilot fuel injections and an increasing indicated engine torque, high pressure fuel pump output is increased by increasing a high pressure fuel pump metering valve command with increasing indicated engine torque before a fuel pressure transition from a higher pressure to a lower pressure is initiated. The high pressure fuel pump metering valve command is decreased and a fuel rail pressure valve is opened at the start of a transition to a lower fuel pressure. The fuel rail valve is closed and the high pressure fuel pump output is decreased as fuel rail pressure drops. Fuel rail pressure is later increased again after a transition in number of pilot fuel injections by increasing high pressure fuel pump output while the fuel rail pressure valve is partially open. FIG. 8 provides an example of such a sequence.

In another example, when fuel rail pressure is increased in response to an increasing number of pilot fuel injections and a reduction in indicated engine torque, high pressure fuel pump output is decreased by decreasing a high pressure fuel pump metering valve command with decreasing indicated engine torque before a fuel pressure transition from a lower pressure to a higher pressure is initiated. The high pressure fuel pump metering valve command is increased and a fuel rail pressure valve is opened to prepare for transitioning to a higher fuel rail fuel pressure. Fuel pressure in the fuel rail may remain substantially constant by increasing the high pressure fuel pump metering valve command while opening the fuel rail pressure control valve. The fuel rail pressure control valve is closed while the high pressure fuel pump output is at a higher to increase fuel rail pressure. Fuel rail pressure may be later decreased again after a transition in number of pilot fuel injections by decreasing high pressure fuel pump output while the fuel rail pressure valve is partially open. FIG. 9 provides an example of such a sequence.

Method 1000 proceeds to exit after the fuel pressure and number of pilot fuel injections are adjusted.

The method of FIG. 10 may determine fuel pressure and number of pilot injections for all cylinders or for one cylinder at a time. If fuel pressure and number of pilot injections is determined for a single cylinder, method 1000 may executed for each cylinder.

Thus, the method of FIG. 10 provides for a method for fueling an engine, comprising: transitioning from supplying fuel to a cylinder based on a first relationship between fuel pressure and a number of pilot fuel injections to supplying fuel to the cylinder based on a second relationship between fuel pressure and the number of pilot fuel injections, the transitioning in response to a first condition when a control parameter is increasing. The method includes where the transitioning is timed to occur at a longest crankshaft angle window during a cylinder cycle where there are no fuel injection events of a cylinder bank. In this way, the method provides for adjusting fuel pressure and timing of when fuel pressure adjustments are made.

The method further comprises transitioning from delivering fuel to the engine at a higher fuel pressure to a lower fuel pressure via at least partially opening a fuel rail pressure control valve. The method also comprises at least partially increasing an opening amount of the fuel rail pressure control valve immediately prior to transitioning to a higher fuel pressure. The method also includes where the transitioning is delayed after the first condition until the longest crankshaft angle window where there are no fuel injection events is reached. The method also includes where the control parameter is engine torque or engine speed. The method also includes where the first relationship is based on a fuel pressure map and a number of pilot fuel injections map. In some examples, the method includes where the transitioning includes increasing fuel pressure via adjusting a high pressure pump metering valve and a fuel rail pressure control valve. The method also includes where the transitioning includes decreasing fuel pressure via adjusting a high pressure pump metering valve and a fuel rail pressure control valve.

The method of FIG. 10 also provides for a method for fueling an engine, comprising: transitioning a first time from supplying fuel to a cylinder at a first fuel pressure that is based on a first number of pilot fuel injections to a second fuel pressure that is based on a second number of pilot fuel injections at a first condition when a control parameter is increasing; and transitioning a second time from supplying fuel to a cylinder at the second fuel pressure that is based on the second number of pilot fuel injections to the first fuel pressure that is based on the first number of pilot fuel injections at a second condition when the control parameter is decreasing. The method also includes where the first and second conditions are different conditions, where the first condition is a first engine torque and the second condition is a second engine torque, and where the first engine torque is greater than the second engine torque.

In some examples, the method includes where the first and second conditions are different conditions, where the first condition is a first engine speed and the second condition is a second engine speed, and where the first engine speed is greater than the second engine speed. The method also includes where transitioning the first time for a first cylinder bank is delayed to begin at a longest crankshaft angle window during an engine cycle where there are no fuel injection events for the first cylinder bank, and where transitioning the first time for a second cylinder bank is delayed to begin at a longest crankshaft angle window during the engine cycle where there are no fuel injection events for the second cylinder bank. The method further comprises where the first fuel pressure and the second fuel pressure are further based on engine speed and torque demand, and where the second number of pilot fuel injections is fewer than the first number of pilot fuel injections. The method includes where the second fuel pressure is transitioned to the first fuel pressure via adjusting a high pressure pump metering valve and a fuel rail pressure control valve.

The method further comprises transitioning from delivering fuel to the engine at a lower fuel pressure to a higher fuel pressure via at least partially closing a fuel rail pressure control valve.

As will be appreciated by one of ordinary skill in the art, the method described in FIG. 10 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps, methods, or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for fueling an engine, comprising:
   supplying fuel to a cylinder based on a pressure output from a first table expressing fuel pressure as a function of a first number of pilot fuel injections supplied to the cylinder in a first mode;
   supplying fuel to the cylinder based on a pressure output from a second table expressing fuel pressure as a function of a second number of pilot fuel injections supplied to the cylinder in a second mode; and
   changing from the first mode to the second mode in response to a first condition when a control parameter is increasing.

2. The method of claim 1, further comprising partially opening a fuel rail pressure control valve to reduce fuel pressure delivered to the cylinder from a higher fuel pressure to a lower fuel pressure in response to the first condition when the control parameter is increasing.

3. The method of claim 2, further comprising at least partially increasing an opening amount of the fuel rail pressure control valve in response to increasing fuel rail pressure.

4. The method of claim 1, where the control parameter is engine torque or engine speed.

5. The method of claim 1, where the pressure output of the first table is further based on engine speed.

6. The method of claim 1, where changing from the first mode to the second mode includes increasing fuel pressure in a fuel rail via adjusting a high pressure pump metering valve and a fuel rail pressure control valve.

7. The method of claim 1, where changing from the first mode to the second mode includes decreasing fuel pressure via adjusting a high pressure pump metering valve and a fuel rail pressure control valve.

8. A method for fueling an engine, comprising:
   supplying fuel to a cylinder at a first fuel pressure that is based on a first number of pilot fuel injections in a first mode, and supplying fuel to the cylinder at a second fuel pressure that is based on a second number of pilot fuel injections in a second mode, and changing from the first mode to the second mode in response to a control parameter increasing; and
   supplying fuel to a cylinder at the second fuel pressure that is based on the second number of pilot fuel injections in the second mode, and supplying fuel to the cylinder at the first fuel pressure that is based on the first number of pilot fuel injections in the first mode, and changing from the second mode to the first mode in response to the control parameter decreasing.

9. The method of claim 8, where the control parameter is engine torque.

10. The method of claim 8, where the control parameter is engine speed.

11. The method of claim 8, further comprising at least partially closing a fuel rail pressure control valve to increase pressure to fuel delivered to.

12. The method of claim 8, further comprising where the first fuel pressure and the second fuel pressure are further based on engine speed and torque demand, and where the second number of pilot fuel injections is fewer than the first number of pilot fuel injections.

13. The method of claim 8, where a high pressure pump metering valve and a fuel rail pressure control valve are adjusted to change from the second mode to the first mode.

14. An engine system, comprising:
   a cylinder;
   a fuel rail;

a fuel injector in fluidic communication with the fuel rail and directly injecting fuel into the cylinder; and a controller including a computer program stored in a non-transitory medium including executable instructions to adjust fuel pressure in the fuel rail based on a number of pilot fuel injections provided to the cylinder during a cycle of the cylinder, the controller including instructions to increase a fuel pressure in the fuel rail via increasing a high pressure fuel pump metering valve command and decreasing a fuel rail pressure control valve command.

15. The engine system of claim 14, where the fuel rail pressure control valve command is increased prior to decreasing the fuel rail pressure control valve command.

16. The engine system of claim 14, further comprising additional instructions to change between two or more fuel pressure storage structures when the number of pilot fuel injections is changed.

17. The engine system of claim 16, where the two or more fuel pressure storage structures are tables including a plurality of fuel pressure values.

18. The engine system of claim 14, further comprising additional controller instructions to adjust the fuel pressure in the fuel rail at a first condition when a control parameter is increasing and adjust fuel pressure at a second condition when the control parameter is decreasing.

19. The engine system of claim 14, further comprising a fuel rail pressure control valve that receives the fuel rail pressure control valve command, a high pressure fuel pump supplying fuel to the fuel rail, and a metering valve that regulates fuel flow to the high pressure fuel pump in response to the high pressure fuel pump metering valve command.

20. The engine system of claim 19, further comprising additional instructions to decrease fuel pressure in the fuel rail via decreasing the high pressure fuel pump metering valve command and increasing the fuel rail pressure control valve command.

* * * * *